No. 862,545.
PATENTED AUG. 6, 1907.
A. DAMERON.
AUTOMOBILE TIRE.
APPLICATION FILED FEB. 18, 1907.
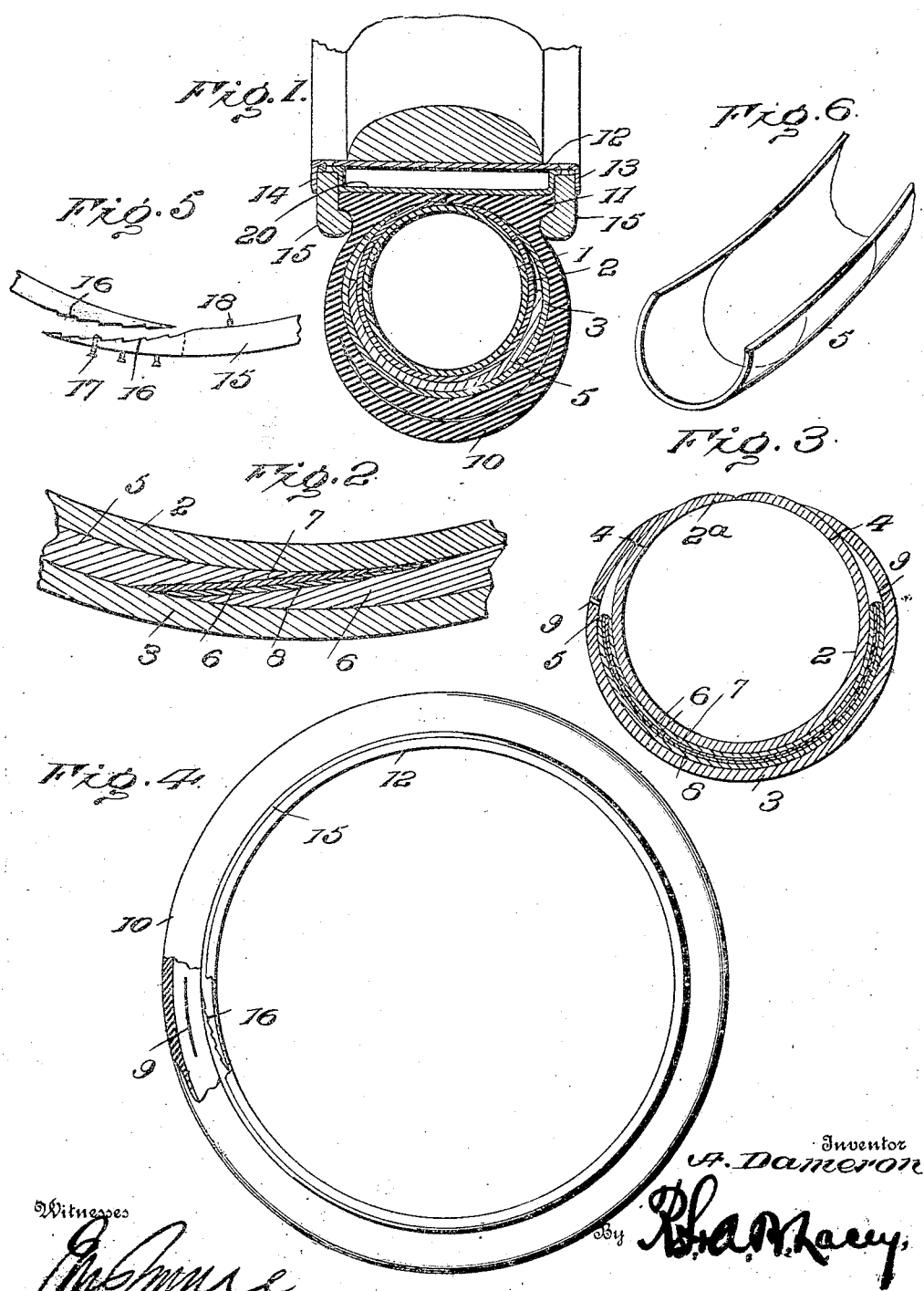

UNITED STATES PATENT OFFICE.

ADOLPHUS DAMERON, OF MAYSVILLE, GEORGIA.

AUTOMOBILE-TIRE.

No. 862,545.   Specification of Letters Patent.   Patented Aug. 6, 1907.

Application filed February 18, 1907. Serial No. 358,127.

*To all whom it may concern:*

Be it known that I, ADOLPHUS DAMERON, a citizen of the United States, residing at Maysville, in the county of Banks and State of Georgia, have invented certain new and useful Improvements in Automobile-Tires, of which the following is a specification.

This invention has for its object an improved construction of resilient tire for automobiles or other vehicles, adapted to impart to the tread of the wheel, the desired resiliency while at the same time the inner pneumatic tube of the tire is secure as against puncture.

The invention consists in certain constructions and arrangements of the parts hereinafter described and claimed.

For a full understanding of the invention and the merits thereof and also to acquire a knowledge of the details of construction of the means for effecting the result, reference is to be had to the following description and accompanying drawings, in which:

Figure 1 is a transverse sectional view of a tire embodying features of my invention; Fig. 2 is a longitudinal sectional view of a portion of the tire; Fig. 3 is a detail transverse sectional view; Fig. 4 is a side elevation of the completed tire, parts being broken away; Fig. 5 is a detail view illustrating a portion of one of the attachment rings; and, Fig. 6 is a detail perspective view of a portion of the steel band employed.

Corresponding and like parts are referred to in the following description and indicated in all the views of the drawings by the same reference characters.

Referring to the drawing, the numeral 1 designates the inner pneumatic tube of my improved tire, said tube being protected or inclosed within a tread protective covering which includes an inner ply 2 of leather or similar tenacious and flexible material, an outer ply 3 which is stitched, as indicated at 4 to the inner ply (the latter extending at its innermost edges beyond the outer ply as indicated at 2ª), and a band 5 of spring steel, or other impenetrable metal or material held between the said two plies 2 and 3. The band 5 is transversely slit and is curved in cross section, as shown, and the ends 6 of said band overlap each other longitudinally and are tapered, as clearly illustrated in the drawing. To one overlapping end 6 a wear plate 7 of highly polished or smoothed brass is secured in any desired manner, while to the opposing face of the other tapered end, a strip of leather 8 is attached, said strip of leather being coextensive with the wear-plate 7, and coacting therewith as the ends 6 slip circumferentially one upon the other in the resilient action of the band. It is proposed to lubricate the wearing surfaces of the parts 7 and 8 with graphite or similar dry lubricant, and to this end the protective covering formed by the plies 2 and 3, which incases the entire band, is provided with a circumferentially extending side slit 9 through which the lubricant may be inserted, when the tire is deflated.

Outside of the protective cover is the outer member of the tire which is designated 10 and which is, as shown, of the clencher type in the present instance, being composed of rubber with any desired design of tread, and preferably embodying one or more embedded layers of canvas or similar textile fabric. The edges 11 of the outer member project outwardly or are formed with the usual clencher flanges for attachment to the metallic rim 12. In the present instance, the rim 12 is provided at its side edges with outwardly facing inverted U-shaped flanges 13 producing sockets 14 adapted to receive the two attachment rings 15. The attachment rings 15 are in the form of split rings, provided with bulges or inwardly disposed ribs adapted to clench the member 10 against the rim 12 in a firm manner, without any danger of cutting the outer member of the tire 10, and each of the rings 15 has its ends overlapped and provided on their opposing faces with interlocking teeth or notches 16 so that the rings may be compressed circumferentially around the main rim 12, the teeth slipping over each other and interlocking in this position, when the desired tension of the rings 15 is reached. The two ends of each ring may be secured together by means of screws 17 or the like. Each ring 15 is provided at one point with a lug 18 adapted to enter a socket formed for it in the respective flange of the main rim 12, so that the said ring may be tightened by drawing upon one end only.

From the foregoing description in connection with the accompanying drawing, it will be seen that I have provided a very simple and efficient construction of puncture proof tire, in which the inner pneumatic tube is effectively protected, while at the same time the characteristic of resiliency is retained, the split band 5 yielding by a sliding action of its overlapped ends, when radial stress is imposed upon the wheel, and not flexing as would be the case if the band 5 were endless.

In the preferred construction of the rim, the same is composed of two sections secured together, the innermost section 20 being arched, as shown, and coacting with the other section to form the sockets for the reception of the attachment rims or rings 15.

Having thus described the invention, what is claimed as new is:

1. A tire, consisting of an inner tube, a protective covering therefor embodying inner and outer plies secured together and an impenetrable spring band interposed between said plies, said band having overlapping ends and provided with wear strips secured to the opposing faces of said ends, and an outer tire section on the outside of said protective covering.

2. A tire, consisting of an inner tube, a protective covering therefor embodying inner and outer plies secured together and an impenetrable spring band interposed between said plies, said band having overlapping ends and provided with wear strips secured to the opposing faces of said ends, and an outer tire section on the outside of said protective covering, the said protective covering being provided with a longitudinally extending side slit registering with said wear strips, as and for the purpose set forth.

In testimony whereof I affix my signature in presence of two witnesses.

ADOLPHUS DAMERON. [L. S.]

Witnesses:
FREDERICK S. STITT,
W. N. WOODSON.